H. E. WHITNEY.
SINK PAIL.
APPLICATION FILED DEC. 15, 1911.

1,173,134.

Patented Feb. 22, 1916.

WITNESSES:
M. E. Flaherty
J. J. Kenneally

INVENTOR:
Horace E. Whitney
By Grant Hayes
his attorneys

THE COLUMBIA PLANOGRAPH CO., WASHINGTON, D. C.

UNITED STATES PATENT OFFICE.

HORACE E. WHITNEY, OF CAMBRIDGE, MASSACHUSETTS, ASSIGNOR TO DOVER STAMPING AND MANUFACTURING COMPANY, OF PORTLAND, MAINE, A CORPORATION OF MAINE.

SINK-PAIL.

1,173,134.      Specification of Letters Patent.      Patented Feb. 22, 1916.

Application filed December 15, 1911. Serial No. 665,980.

*To all whom it may concern:*

Be it known that I, HORACE E. WHITNEY, of Cambridge, in the county of Middlesex and State of Massachusetts, a citizen of the United States, have invented a new and useful Improvement in Sink-Pails, of which the following is a specification.

There are many devices for use in a kitchen sink to receive refuse. They are usually made either of wire so that they may be self-draining or else a separate strainer of some kind is used with them in order that the liquid refuse may drain off from the solid matter and pass down the sink outlet.

My invention combines the features of a pail with a strainer in such a way that the refuse may be first strained and then dumped into the pail and the pail be ordinarily covered.

My invention may be embodied in a variety of forms, the essentials being the pail itself which usually contains the solid matter, having a cover of suitable shape attached thereto and provided with perforations so that when the cover is in open position the pail will act as a stand to support the cover which will hang over the sink outside of the pail, and when the refuse is poured into the cover the liquid will drain off into the sink, the solid matter being retained in the open cover and being thrown into the pail by the closing of the cover on the pail.

My invention will be understood by reference to the drawings, in which—

Figure 1:
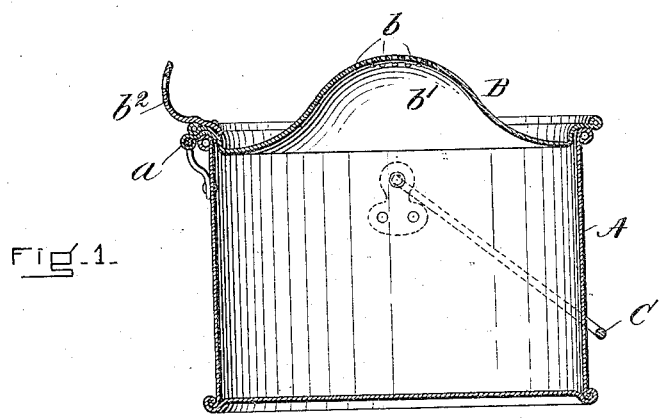
Figure 2:
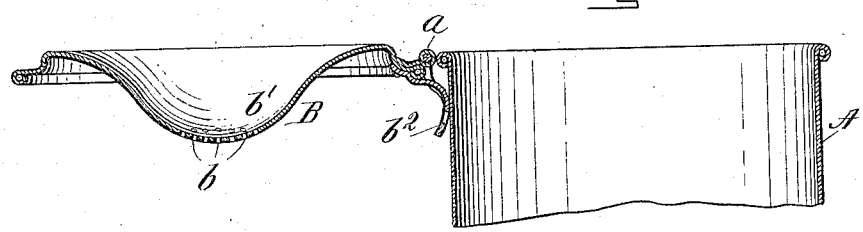
Figure 3:
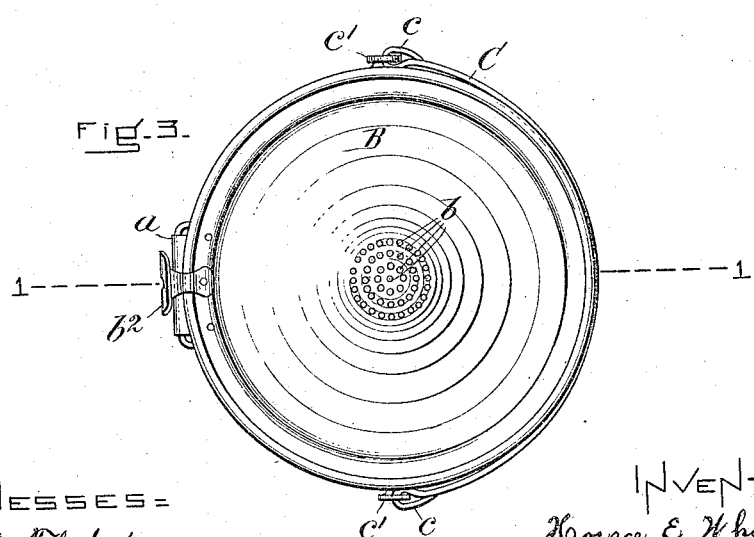

Figure 1 is a vertical section on line 1—1 of Fig. 3. Fig. 2 is a fragmental view showing the cover in open position ready to receive the refuse, and Fig. 3 is a plan, the cover being closed.

The receptacle itself is marked A and made of any suitable shape and size, the device as a whole being preferably made of galvanized iron or some like material. Hinged to one edge of the receptacle as at $a$ is the cover B which as shown is dished on its inner face so as to receive the refuse without liability of its scattering and being provided with perforations $b$ to provide drainage for the liquid matter. For this purpose the dished portion $b^1$ as shown is bowl-shaped so that when the cover is closed upon the receptacle it forms a domelike addition to the receptacle. This shape, however, is immaterial so long as the essentials of the cover are secured, these essentials being the confining of the solid matter more or less at the edge of the cover so that it will not spill over as by a boundary or rim which of course need not be integral with the cover, and the free access of the liquid matter to the perforations $b$ which are so located as to allow the liquid matter to drain off. As shown these perforations are located merely in the lowest portion of the concavity of the cover when open, but they may be otherwise located and the cover may be otherwise shaped if thought best. The cover also has a lug $b^2$ attached thereto adjacent to the hinge $a$ which lug serves the double purpose of providing means for lifting the cover about its hinge to open the receptacle and also of resting against the side of the receptacle when the cover has been fully opened as shown in Fig. 2 and thus form a stop which will maintain the cover in horizontal position as there shown. In addition, for convenience, I prefer to provide a handle or bail C of any suitable character, that shown being the ordinary bail attached to eyes $c$ in lugs $c^1$ fastened to the side of the receptacle.

In practice when it is desired to use the receptacle the cover is thrown back as in Fig. 2 with the assistance of the lug $b^2$ if desired, and the refuse is thrown into the recess in the cover. After it has drained off sufficiently the cover is thrown over to close the pail, this act dumping the solid matter into the receptacle which of course will be emptied from time to time as convenient, and closing it.

It is readily seen that the device can be very simply and cheaply made and affords a very sanitary means of retaining solid kitchen refuse and draining the liquid matter therefrom and closing the receptacle when the draining operation is completed, thus providing a receptacle which is ordinarily closed to confine the odors, etc., which would otherwise be given off by the refuse.

What I claim as my invention is:—

1. A sink pail having a perforated cover dish-formed to provide a receptacle when in open position, combined with means to support said cover in open position outside of said pail; whereby refuse placed in said dish-formed cover when in open position is drained outside of said pail.

2. A sink pail having a single dish-formed cover to completely close the same and to provide a receptacle when in open position, and which cover is perforated at its central portion to afford drainage for the sloping walls of such receptacle, combined with means to support said cover in open position outside of said pail; whereby refuse placed in said cover, when the latter is in open position, will be drained outside of said pail.

3. A sink pail having a hinged dish-formed cover to provide a receptacle when in open position, and which cover is perforated to afford drainage for the sloping walls of such receptacle, said hinged cover being provided with a lug or arm which projects upward when the cover is closed, so as to serve as a means for lifting the cover, but which extends downward when the cover is open so as to serve as a stop to bear against said pail to support said cover horizontally in open position outside of said pail; whereby refuse placed in said cover, when the latter is in open position, will be drained outside of said pail.

HORACE E. WHITNEY.

Witnesses:
GEORGE O. G. COALE,
M. E. FLAHERTY.

Copies of this patent may be obtained for five cents each, by addressing the "Commissioner of Patents. Washington, D. C."